April 24, 1928.  1,667,439
J. N. A. SAUER
APPARATUS FOR PURIFYING AND SIMULTANEOUSLY STERILIZING
WATER OR OTHER LIQUIDS OR GASES
Filed Aug. 6, 1923   2 Sheets-Sheet 2
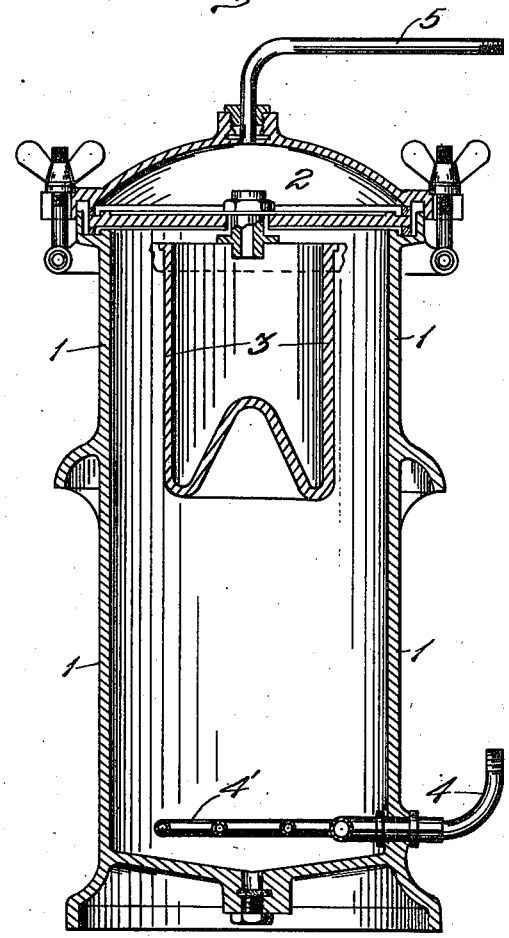
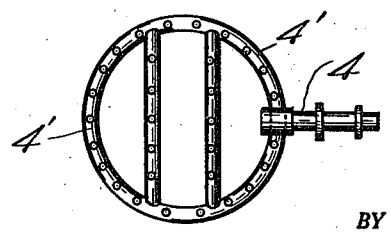
INVENTOR.
BY
ATTORNEYS.

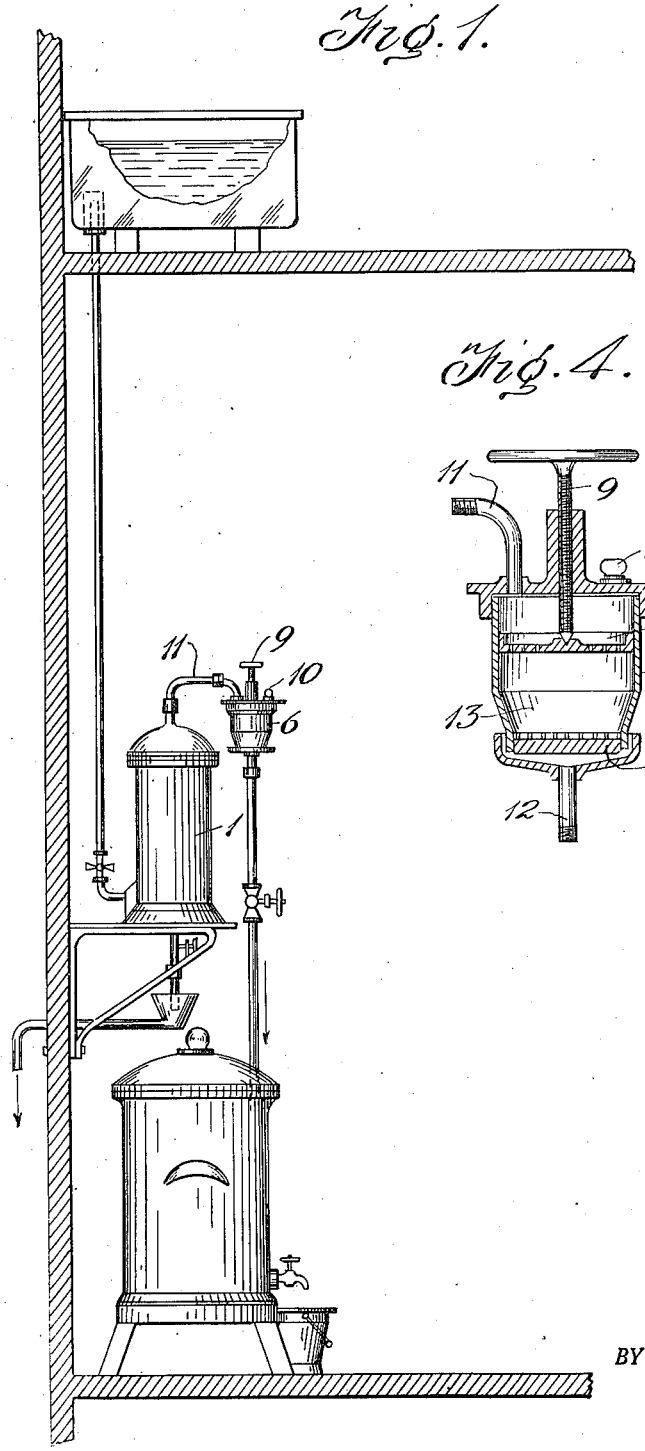

Patented Apr. 24, 1928.

1,667,439

UNITED STATES PATENT OFFICE.

JOHAN NICOLAAS ADOLF SAUER, OF AMSTERDAM, NETHERLANDS.

APPARATUS FOR PURIFYING AND SIMULTANEOUSLY STERILIZING WATER OR OTHER LIQUIDS OR GASES.

Application filed August 6, 1923, Serial No. 656,056, and in Germany August 18, 1922.

My invention relates to new and useful improvements in a process of and apparatus for treating water and other liquids and gases, in view of their purification and simultaneous sterilization. The invention will be described more specially as applied to water, but it will be understood that it may as well be applied to the purification with simultaneous sterilization of all kinds of impure, turbid and contaminated liquids, such as sugar juices and solutions, oils, fats, alcohols, spirits, etc. and also for freeing gases of suspended impurities of animal, vegetable and mineral character and of micro-organisms, bacteria, fungi germs, etc.

With reference to water, the invention aims at the purification and sterilization of any impure, turbid and contaminated water or aqueous liquid (say sewage), which according to the new process may be converted readily into either absolutely safe drinking water of pure taste or water for technical use, as in breweries, dyeing establishments, etc. or for boiler feeding.

It has long been common to purify water or other liquids treating it with adsorbing (decolorizing, filtering, purifying, etc.) agents, such as e. g. infusorial earths, fuller's earth, bleaching earths, Florida earth, china clay, paper pulp, cellulose, asbestos, vegetable or animal charcoals, cokes, etc. In many cases the water filtered through such adsorbing agents was also more or less freed of the microorganisms present therein, although the said adsorbents were generally deemed insufficient for securing a substantial and efficacious sterilization of the liquid.

Applicant has found that decolorizing carbons (active or artificially activated carbons) present particular advantages for the purposes set forth above, in comparison with other charcoals or other adsorbents in general, as not only they effect a thorough purification by adsorbing the suspended and colloidal impurities of animal, vegetable and mineral origin, but they are also very efficacious in removing micro-organisms so as to render the water or other liquid practically or substantially sterile.

Among the several kinds and species of active carbons and charcoals of vegetable, animal or mineral (carbonaceous) origin brought on the market, such carbons as still retain the microscopic structure remaining from the original vegetable raw material used in making the same, and which have an actual carbon content (free carbon) of about 90% (figured on a waterfree basis), have been found to be extraordinarily suitable for use in all cases where an efficacious sterilization of the water or other liquids is aimed at.

The treatment of liquids with decolorizing or active carbon or other adsorbing agents for producing the purification (and eventually the sterilization) of the liquid is in general carried out by suspending the agent in the liquid to be treated, stirring up the mixture of liquid and agent in order to cause a perfect intermingling and contacting of each of the liquid particles with the agent, and then separating the mixture in any convenient manner; or filtering the liquid if desired under pressure or suction through one or more layers or columns of the agent.

This last mode of operation, which, as will be realized, suits the best for sterilization, is only applicable to easily filtrable and clear liquids or gases, because if filtering impure, turbid or viscous liquids, heavily charged with suspended or colloidal matter, the filter layers will rapidly become obstructed and hence impermeable, making further filtration impossible, so that the process must be interrupted and the filter layers renewed long before the material has lost its adsorptive capacity.

Now it has been found out in the use of decolorizing carbons for purifying and simultaneously sterilizing water or other liquids, that neither the treatment with the agent in suspension nor the filtration through layers of the agent, if one of said operations is carried out alone and independently from the other, could lead in a technical and economical way to the effect aimed at, as either no substantial sterilization was obtained, or the amount of adsorbing agent needed was too great to make the process workable from an economical and technical standpoint.

Now my present invention obviates the drawbacks of the hitherto known processes of purifying and simultaneously sterilizing liquids and gases.

I have found as a result of many experiments that in order to obtain the most effective action of the adsorbing agent for purifying, decolorizing, deodorizing, sterilizing water or other liquids or gases, it is preferred to subject the liquid or gas to be treated to a combined or two-phase treatment, consisting in firstly suspending a quantity of pulverized or granulated agent in the liquid or gas by stirring up or otherwise provoking a thorough contact of each liquid or gaseous particle with the adsorbing surface of the agent, then separating the mixture of liquid and agent in any convenient way, and secondly filtering the thus treated liquid or gas through one or more layers or columns of decolorizing carbon.

The first or preliminary step of the process, viz. the suspension operation and the following separation steps effects the removal of the bulk of suspended and colloidal matters but generally leaves the liquid or gas insufficiently sterilized. Thus the second step or filtering operation may be carried out on a substantially purified liquid or gas which has only to undergo a complementary purification and sterilization to free it of the remaining small portion of impurities and micro-organisms which it is very difficult to remove.

Further I have found that the adsorbing capacity of the layer or layers of decolorizing carbon can be considerably increased by compressing said layers by suitable mechanical means, which compression is effected independently of the filtration pressure of the liquid or gas passed through the layer.

The invention comprises also a new apparatus for carrying the above described process into practice.

The technical effect of the invention consists among other features in that both the purification and the substantial sterilization of very turbid and highly contaminated liquids can be obtained to a completeness hitherto impossible with the use of relatively very minute quantities of adsorbing agent. The filter layers are not subject to obstructing and may be used during a very long time without decrease of their capacity.

The two steps of the combined process may be carried out at any desired temperature and pressure, which may be the same or different for both operations. In some cases it may be convenient to heat the liquid to be treated up to its boiling point.

Also the same kind or different kinds of adsorbing agents may be used in the two operations. So it may be preferred to use differently granulated agents, and viz, in the treatment of liquids relatively coarse material for suspension and finely pulverized material for the filter layers, and inversely in the treatment of gases.

So e. g. preference may be given for suspending in liquids to an active carbon of vegetable origin showing the microscopical organized structure arising from the raw material, such as norit or eponit, while the filter layers may be composed of finer powdered active carbon in which such structure has been lost.

Although it will be preferred in general to use active carbons in both steps of the process, it will be possible in some cases to make use, viz, for the suspension, of other adsorbing agents as enumerated in the introduction of the present specification, said agents being used alone or mixed with active carbon.

For carrying out the suspension process, a quantity in excess of the absorbing agent may be brought into the suspension container for starting the process and the successive batches of liquid to be treated fed continuously to said container so as to be acted upon by the same quantity of agent, which may be utilized for a long period before being spent. Or the agent may be added in portions to the liquid in treatment, i. e. a determined quantity of agent is used for starting the process and smaller quantities of agent are added to batches of liquid subsequently treated.

In the practice of the process it is of primordial importance that the layers of adsorbing agent in the filter container be filled up very closely so as to be in intimate contact everywhere with the container walls and not to present any interruptions, pockets, gaps, crevices or the like, while moreover it is of importance to diminish as far as possible the capillary interstices between the particles of the agent, in order to increase its adsorptive power for micro-organisms. To this effect the material of the layer will preferably be firmly compressed and maintained under pressure in operation. This compression of the layer is done before starting the filtration and is independent from the pressure applied on the liquid for its filtration.

The accompanying drawing illustrates by way of example an embodiment of apparatus suitable for example for purifying and sterilizing drinking water.

Fig. 1 is a general view of the combined apparatus;

Fig. 2 is a vertical section through the suspension container;

Fig. 3 is a device for spreading the liquid to be treated into the suspension chamber;

Fig. 4 is a vertical section of the apparatus for filtering the liquid through a layer of decolorizing carbon.

The suspension apparatus illustrated in Fig. 2 consists in a hermetically closed container 1 with a removable cover 2 capable of being tightly closed and fixed to this latter in the interior of the container a porous filter device 3, as e. g. a candle filter, through which the liquid after having been subjected to the action of the adsorbing agent in suspension is filtered under pressure or suction and discharged into the pipe or main 5 leading to a device for effecting the second step of the process. The liquid (say water) to be treated is fed to the bottom of the container 1 by the main 4, provided with a spreading or distributing device 4'; the liquid fed under pressure is forced through the apertures of the device 4' and so brings and maintains the agent present in the container in suspension, whereby an efficacious action of the agent upon the liquid is secured. If desired a stirring device may also be provided in the container.

Fig. 4 shows in detail the filter apparatus in which the liquid more or less completely purified in the suspension process undergoes a final purification with a practically complete sterilization. With reference to said figure, 6 designates the filter container, provided with a porous or perforated bottom plate 7, which may be covered if desired with a filter cloth, and a porous or perforated upper plate 8, preferably a perforated metallic plate, movable up and down by operating a screw 9. A layer of pulverized adsorbing agent is provided between the two plates 7 and 8 and after having moistened the material of the layer, it is compressed firmly by operating the screw 9, so as to fill the space between the plates fitting snugly against the side walls of the container 6. The apparatus is provided further with an air valve 10, an admission main 11 coming from the suspension apparatus and a discharge main 12 for the finally purified liquid. Instead of the screw 9 other mechanical means may be used, as e. g. compression springs, rings, etc.

The filtration through the layers may be effected from above or from below, as desired.

I do not herein claim broadly the removal of living microorganisms by the treatment of the liquor containing the same, with decolorizing vegetable carbon, such subject matter being claimed in a copending application Serial No. 182,882, Patent No. 1,539,775 upon which case the present process is to be regarded as an improvement and a further development.

What I claim as my invention is:

1. An apparatus for carrying out the process of purifying fluids comprising an hermetically closed container, means for feeding fluid through said container and for suspending granular adsorbent in the fluid in said container, a device in said container for separating the granular adsorbent from the fluid, and a filter chamber communicating with the fluid outlet of said container, containing a filtering layer of activated carbon compressed between porous or perforated plates, whose distance apart is variable by mechanical means.

2. An apparatus for purifying fluids comprising a closed container, fluid inlet and outlet means for said container, means in said container for suspending absorbent material in the fluid in said container, a device in said container for separating absorbent material from the fluid and communicating with said fluid outlet means, and a filter chamber communicating with the said fluid outlet means of said container, said chamber containing a filtering body comprising active carbon.

In testimony whereof I affix my signature.

JOHAN NICOLAAS ADOLF SAUER.